United States Patent Office 2,869,674
Patented Jan. 20, 1959

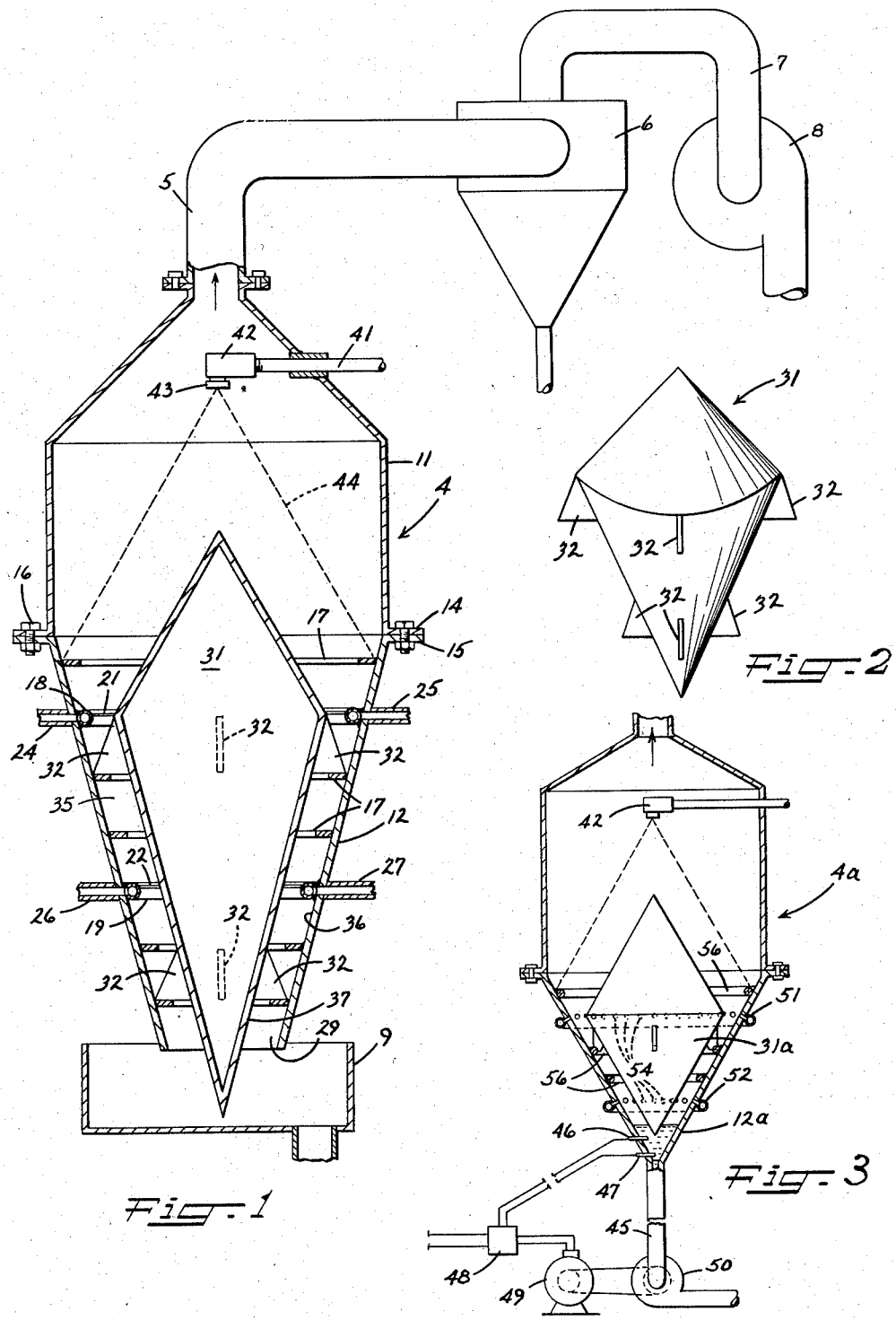

2,869,674

LIQUID AND GAS SEPARATOR

Charles D. Vandenburgh, Charlestown, Md., assignor to American Viscose Corporation, Philadelphia, Pa., a corporation of Delaware Application May 13, 1955, Serial No. 508,229

5 Claims. (Cl. 183—2.5)

The present invention relates to the removal of vapors from liquids, and particularly it relates to removing occluded or dissolved gases and/or readily volatilizable components from a carrier liquid, such as spinning bath solution which has been used to coagulate viscose into yarns or films.

Depending upon the particular solutions and the particular gases dissolved therein, any one or more of several reasons may make it desirable to remove or may even necessitate the removal of the dissolved gases therefrom. In the case of spinning baths for viscose the chief gas which it is desirable to remove is hydrogen sulfide but smaller amounts of other gases such as sulfur dioxide and carbon disulfide vapors occur along with the hydrogen sulfide and are removed with it. Not only does the hydrogen sulfide give rise to an unpleasant poisonous and corrosive atmosphere in the spinning rooms as it is slowly liberated from the bath, but it also has an important effect upon the spinning. The presence of excess hydrogen sulfide hinders spinning by inhibiting the regeneration of the cellulose from the xanthate. Also, hydrogen sulfide when removed is no longer able to collect around the spinneret holes and cause weakening or breaking of the filaments being spun as would otherwise frequently occur.

Viscose spinning baths contain dissolved gases, chiefly hydrogen sulfide as stated above, products including thionic acids which break down in the presence of oxygen to give hydrogen sulfide, and compounds which can be reduced by hydrogen to give hydrogen sulfide. The hydrogen sulfide available as a result of oxidation amounts to about 8% of the total available hydrogen sulfide whereas the amount developed through reduction amounts to about 6% of the total, these proportions varying depending upon the conditions of spinning and the particular constitution of the spinning bath under consideration. While it is not essential that the small proportion of hydrogen sulfide available as a result of reduction need be removed to prevent appreciable inhibition of the regeneration reaction, it is nevertheless important to remove the greater part of that requiring oxidation for liberation, especially because of the fact that such removal insures the breakdown of the greater proportion, at least, of the thionic acids. It is therefore necessary to obtain intimate mixing of air or other gas containing oxidizing constituents throughout the mass of the solution being treated in order to obtain rapid and substantially complete oxidation of the compounds yielding hydrogen sulfide.

It is an object of this invention to provide an improved apparatus for removing gases from liquids. It is another object to provide an apparatus whereby purification of a liquid may be effected by intimate mixing of the liquid to be treated with a gaseous material that is substantially insoluble in the liquid by a process in which substantial vacuum need not be employed. Still another object is to provide apparatus in accordance with the foregoing objects that is simply and inexpensively constructed and is adapted for construction in a plurality of small units.

It is also an object to provide an apparatus that may be readily dismantled. A specific object is to provide a system for accomplishing efficient aeration of spinning bath solution for regenerated cellulose for the purpose of effectively removing such gases as carbon disulfide and hydrogen sulfide.

Other objects, features, and advantages will become apparent from the following description of the invention and the drawing relating thereto in which Figure 1 is an elevation, partly in section and partly diagrammatic, illustrating a liquid-gas separating system in accordance with the invention;

Figure 2 is a perspective view of a removable member shown as contained within the sectioned portion of the apparatus of Figure 1;

Figure 3 is an elevation, partly in section and partly diagrammatic, of a modified apparatus.

In brief, the invention consists of an apparatus by which a liquid comprising gaseous or readily volatilizable materials are supplied to a chamber having a truncated lower wall section of which the cross section decreases with height and is formed to provide elements such as shelves or gulleys, which are overflowed by liquid which drops from each element free of the wall to a lower level as the liquid passes from the top of the wall section to a central opening at the bottom of the chamber. At one or more intermediate levels within the lower wall section air or other gas is blown at high velocity into the chamber from one or more openings distributed at each level circumferentially of the lower section wall along a horizontal plane. To obtain desired intermixing of the gas blown into the chamber and the descending liquid, the apparatus comprises an inner member having its peripheral surface uniformly spaced from the inner surface of the lower wall section. The chamber has an upper wall section connected with a suction means for withdrawing gaseous materials from the chamber at such a rate as to prevent any discharge thereof from the lower end of the chamber. In a preferred embodiment the lower wall section and the lower portion of member are obconical and in concentric relationship.

Considering now the invention in greater detail, Figure 1 illustrates an aeration type separator 4 connected by a vapor conduit 5 to entrainment collector 6. The latter is connected by a tube 7 to a vapor pump 8. The separator 4 is positioned above a liquid receiver 9.

The separator 4 embodies the improvements contemplated by this invention. As shown, it comprises a wall constituted of an upper cylindrical conical wall member 11 and a lower truncated obconical wall member 12. These wall members are joined along respective flanges 14 and 15 by means such as bolts 16. Supported along the inner surface of the wall member 12 are a plurality of rings 17 which form annular shelves within the separator. The rings 17, in a preferred form, extend downwardly as they extend radially inwardly from the inner periphery of the wall member 12 so as to provide natural drainage thereover to drainage surfaces along the inner diameters of the rings. Also secured along the inner surface of the lower wall member is a pair of ring like ducts 18 and 19 which have slits 21 and 22, respectively. The slit of each of these ducts extends substantially the entire length thereof and is formed in the upper half of the duct so as to direct a gas, supplied thereto under pressure, upwardly within the separator. The gas discharged from each duct passes through the descending stream of liquid moving downwardly from the ring 17 immediately above. This descending liquid stream is circular in shape in view of the configuration of the rings 17, and the air impinges thereagainst along its entire circumference.

Each duct is supplied with a gas such as air under pressure, through a pair of tubes which pass through the wall of the member 12 and connect with the respective ducts. For example, the supply tubes 24 and 25 are disposed about 180° apart with respect to the vertical axis of the separator 4. Although one supply tube may be used for each duct, the use of a pair of supply tubes provides more uniformity in the pattern with which air is discharged from the slit of the duct. The ducts and the rings 17 are preferably disposed at uniformly spaced intervals within the separator, with a plurality of rings being located between adjacent ducts. Optionally, additional gas discharging ducts may be provided than shown, to the extent that they may be placed between each pair of adjacent rings. Satisfactory operation of the separator 4 requires that substantially all of the gaseous material leaving the separator be withdrawn through the conduit 5 and that a minimum or none of the gas pass through the opening 29 at the bottom of the member 12. The separator may, in fact, be operated with slight suction developed within the opening 29.

Since the slits 21 and 22 are aligned to direct gas upwardly, there is a tendency for a suction effect to be produced in the lower part of the separator while a pressure force, greater than atmospheric, is developed in the upper part of the separator. When the opening 29 is contiguous with the atmosphere, air tends to be sucked upwardly into the separator. To avoid such suction effect at the opening 29, the vapor pump 8 is operated at a sufficiently reduced speed to control the escape of vapor from the upper portion of the separator. Excellent agitation and aeration of the liquid is obtained under these operating conditions.

The separator further comprises a central vapor guiding member 31 having lateral bosses 32 engaging with selected spaced rings 17, as shown, for supporting the member 31 in desired position. The bosses 32 of each circular series of bosses are constructed so their outermost portions lie on a circle having a diameter less than that of the ring or duct immediately above the ring with which the respective bosses engage. Thus the member 31 may be freely supported on a pair of rings 17 and may be readily elevated from the member 12 when servicing the apparatus. The member 31 is so constructed that the outer periphery of its obconical portion is approximately parallel to the wall of the member 12 and is spaced sufficiently close thereto, e. g., within 1 or 2 inches, to insure that the gas, discharged from the ducts 18 and 19, impinges with the descending liquid stream with considerable turbulence in the region 35, defined by the obconical walls of the members 12 and 31. For example, in a separator unit having a maximum inner diameter of 13 inches, the annular region 35 is approximately 1½ inches in width, measured between the opposing surfaces 36 and 37 of the members 12 and 31 respectively. The member 31 is hollow for the sake of economy in manufacture and weight considerations. In reclaiming acid spinning bath for viscose, the unit is constructed essentially of a non-corrosive material, such as lead, or a lead-alloy comprising sufficient antimony to provide requisite hardness. It is desirable therefore to avoid the use of excessively heavy construction.

An important feature of the present invention is the manner in which the liquid to be treated is fed into the separator 4. As shown in Figure 1, a pipe 41 extends through the upper conical portion of the wall member 11 to which it is rigidly secured as by welding or lead burning. The pipe 41 supports a nozzle 42 with the sprayhead 43 thereof aligned approximately along the vertical axis of the separator. The nozzles are of the type that will produce a spray in the form of a hollow conical stream 44 which distributes the liquid to be treated uniformly along an upper circumference of the inner surface of the member 12. Preferably the spray is deposited on the wall of the member 12 just above the uppermost ring 17. A nozzle suitable for this purpose is one manufactured by the Spraying Systems Company known as Whirljet Type AR20.

With the liquid fed through the pipe 41 and the air supplied through the distributors or tubes 18 and 19 adjusted to desired rates, the speed of the pump 8 is regulated to withdraw all gaseous materials from the separator 4 at a rate such that none of the gaseous material escapes through the bottom opening 29. All air introduced through the distributing tubes 18 and 19 passes upwardly and as a result of the turbulence produced in the region 35, the liquid passing downwardly therethrough is thoroughly agitated and broken up into fine droplets. Because of the thorough aeration given the liquid, a material such as a thionic acid breaks down in the presence of oxygen to give gaseous hydrogen sulfide which is readily removed through the exhaust system along with other gases such as carbon disulfide and hydrogen sulfide carried as such by the used spinning bath.

In accordance with another manner of operation, the separator may be constructed as shown in Figure 3 wherein the obconical separator 4a terminates in a drain pipe 45. By means of a conventional liquid level sensitive system comprising electrical liquid sensitive elements 46 and 47 protruding into the bottom of the wall member 12a at different levels, and an electrically operated switch 48 which controls the power circuit for a motor 49, a pump 50 connected to the pipe 45 may be operated to withdraw treated liquid from the separator. This pump is set into operation as the liquid reaches the level of the upper element 46 and is shut off when the level is reduced to that of the lower element 47. From Figure 3 may be seen also that the construction of the gas supplying system for the separator and the type of rings used to obtain free fall paths of liquid within the separator may be varied. The gas supplying tubes 51 and 52 are attached to the exterior surface of the member 12a as by lead burning. A series of fine holes 54 may then be drilled through the wall of the member 12a and the adjacent tube. A plurality of horizontally aligned rings 56 are secured at different levels within the separator 4a to provide a series of free fall paths for liquid descending thereover.

From a practical maintenance standpoint, it is found advantageous to aerate liquid within a separator as herein described and to withdraw vapors therefrom under mild suction by a simple centrifugal blower. When the separator is operated under conditions tending to produce pressure in the vapor discharging duct thereof, and suction in the lower liquid discharging portion of the separator, a simple valve may be used in place of the blower to control the escape of vapor so as to obtain a desired pressure within the liquid discharging portion. The system provided by the present invention is found to be far more simple to operate and maintain, for example, than those systems employing high vacuum extraction of vapors from liquids.

While preferred embodiments of the invention have been shown and described, it is to be understood that changes and variations may be made without departing from the spirit and scope of the invention as defined in the appended claims.

I claim:
1. Apparatus for separating a gaseous material from a liquid comprising a chamber having a lower truncated section which decreases in cross section at progressively lower levels, at least one element supported within said lower section along the interior wall surface thereof, said element extending in an approximately horizontal plane to provide a continuous drainage surface over which liquid may drip from an upper portion of the wall portion thereof to a lower surface, means disposed circumferentially and horizontally along said lower section and below said element for discharging a gas at high velocity in a direction away from the inner wall surface and through the path of the dripping liquid, nozzle means mounted in said chamber above said member for discharging a hollow conical stream of liquid onto a portion of the inner wall surface located above said drainage surface, a member supported within the lower section in uniformly spaced relation with said inner wall surface to provide a narrow region between said member and the wall surface within which said gas and liquid are mixed, and suction means connected at the top of the chamber for withdrawing gaseous materials therefrom.

2. Apparatus as defined in claim 1 including a plurality of elements supported along the interior wall surface in vertically spaced relationship and wherein the means for discharging a gas comprises a duct located between an adjacent pair of elements.

3. Apparatus as defined in claim 1 wherein said member is freely supported within the chamber and includes laterally projecting bosses engaging with at least one of said elements.

4. Apparatus for separating a gaseous material from a liquid comprising a chamber having a lower obconical truncated wall section, an element supported within said lower section along the interior surface thereof said element extending in an approximately horizontal plane to provide a continuous drainage surface over which liquid may drip from an upper portion of said interior surface to a lower portion thereof, means disposed circumferentially and horizontally along the inner surface of the wall section at a level below said element for discharging a gas at high velocity through the path of the liquid passing downwardly from said element, an ovate conical member supported within the chamber in spaced relationship therein, said member having a lower obconical portion disposed in concentric uniformly spaced relation with the inner surface of said wall section to provide a narrow region between the member and the wall section within which the gas and the liquid are mixed, nozzle means mounted in said chamber above the member for discharging a hollow conical liquid stream onto an interior surface of said chamber located above said element, and suction means connected at the top of the chamber for withdrawing gaseous materials therefrom.

5. Apparatus for separating a gaseous material from a liquid comprising a chamber having upper and lower wall sections, removable means for joining said sections in sealed relationship, the lower section being truncated and obconical and having an opening at its lower end, a plurality of shelves supported along the interior surface of the lower wall section at different levels, each shelf extending in an approximately horizontal plane to provide a continuous drainage surface over which liquid may drip from an upper portion of the interior surface of said lower section to a lower portion thereof, means disposed horizontally between at least one pair of said shelves and circumferentially of said lower section for discharging a gas at high velocity through the path of the liquid passing downwardly over said shelves, an ovate conical member, bosses extending laterally from said ovate conical member and engaging with at least one of said shelves, said bosses serving to uniformly space the lower portion of said member away from the inner surface of the lower wall section to provide a narrow region within which said gas and liquid are mixed, nozzle means mounted in said chamber above the member for discharging a hollow conical liquid stream onto an interior surface of the chamber located above the uppermost of said shelves, such a means connected with the upper wall member for removing gases from the chamber.

References Cited in the file of this patent

UNITED STATES PATENTS

| | | |
|---|---|---|
| 1,216,747 | Taggart | Feb. 20, 1917 |
| 2,204,062 | Applebaum | June 11, 1940 |
| 2,355,057 | Copeland | Aug. 8, 1944 |
| 2,677,433 | Kretzschmar | May 4, 1954 |
| 2,684,728 | Malm | July 27, 1954 |
| 2,689,018 | Kittredge | Sept. 14, 1954 |
| 2,738,852 | Freneau et al. | Mar. 20, 1956 |

FOREIGN PATENTS

| | | |
|---|---|---|
| 638,198 | Great Britain | May 31, 1950 |